US012581436B2

(12) United States Patent (10) Patent No.: US 12,581,436 B2
Abedini et al. (45) Date of Patent: Mar. 17, 2026

(54) CELL MEASUREMENTS IN ENERGY SAVING MODE

(71) Applicant: QUALCOMM Incorporated, San Diego, CA (US)

(72) Inventors: Navid Abedini, Basking Ridge, NJ (US); Naeem Akl, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 18/185,846

(22) Filed: Mar. 17, 2023

(65) Prior Publication Data

US 2024/0314712 A1     Sep. 19, 2024

(51) Int. Cl.
*H04W 56/00*      (2009.01)
*H04L 5/00*       (2006.01)

(52) U.S. Cl.
CPC ....... *H04W 56/0015* (2013.01); *H04L 5/0051* (2013.01)

(58) Field of Classification Search
CPC .......................... H04W 56/0015; H04L 5/0051
See application file for complete search history.

(56) References Cited

U.S. PATENT DOCUMENTS

2014/0362750 A1* 12/2014 Song ................. H04W 36/0072
                                                370/311
2015/0029884 A1*  1/2015 Seo ....................... H04W 24/10
                                                370/252

2018/0220318 A1   8/2018 Uemura et al.
2022/0046564 A1   2/2022 Shimoda et al.
2022/0303921 A1*  9/2022 Cui .................... H04W 56/0045
2023/0247574 A1*  8/2023 Ghanbarinejad ... H04W 56/001
                                                370/503
2023/0269682 A1*  8/2023 Du ........................ H04W 24/10
                                                370/252
2024/0049069 A1*  2/2024 Zhou ................. H04W 74/0833
2024/0284323 A1*  8/2024 Khlass .............. H04W 36/0083

OTHER PUBLICATIONS

International Search Report and Written Opinion—PCT/US2024/018844—ISA/EPO—Jul. 8, 2024.
MCC, et al., "Big CR for TS 38.133 Core Maintenance Part-1 (Rel-16)", 3GPP TSG-RAN WG4 Meeting # 103-e, R4-2211231, 3GPP TSG-RAN Meeting #96, RP-221655, 3rd Generation Partnership Project, Mobile Competence Centre, 650, Route Des Lucioles, F-06921 Sophia-Antipolis Cedex, France, vol. RAN WG4, No. Electronic Meeting, May 9, 2022-2022052, May 30, 2022, 48 Pages, XP052153786, pp. 4-39.

* cited by examiner

*Primary Examiner* — Derrick V Rose
(74) *Attorney, Agent, or Firm* — Harrity & Harrity, LLP

(57)                ABSTRACT

Various aspects of the present disclosure generally relate to wireless communication. In some aspects, a user equipment (UE) may receive a channel state information reference signal (CSI-RS) output by a first cell operating in an energy saving mode. The UE may receive timing information output by a second cell. The UE may measure the CSI-RS output by the first cell using the timing information output by the second cell. Numerous other aspects are described.

16 Claims, 12 Drawing Sheets

600

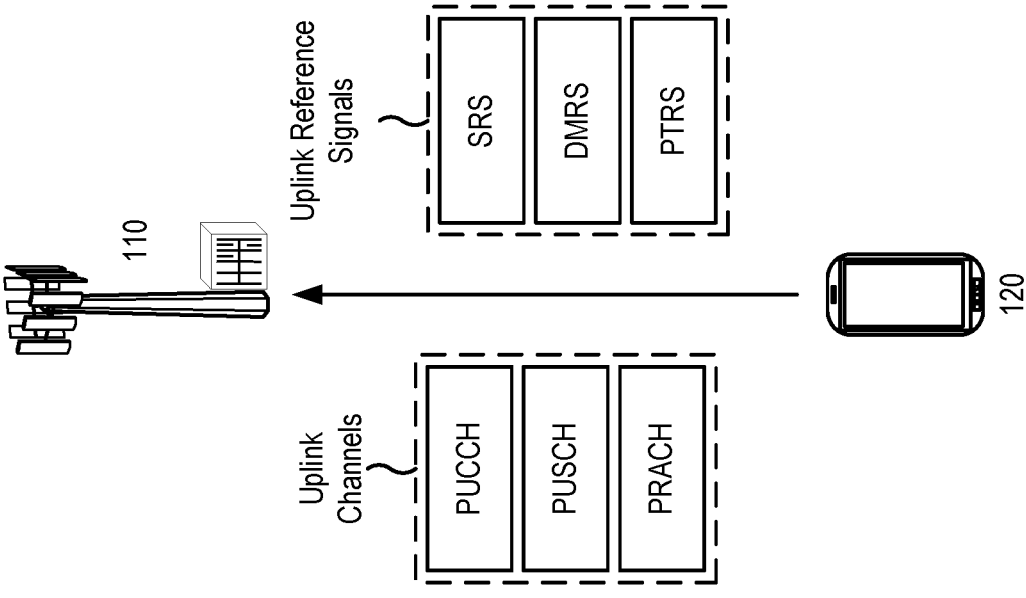
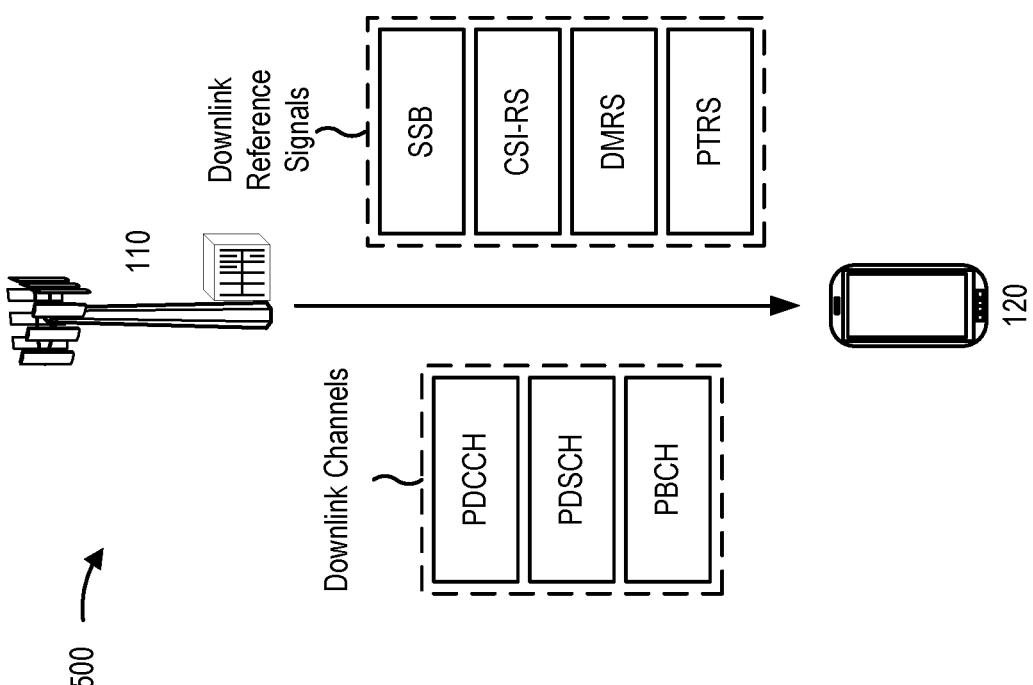
FIG. 5

810    Receive a channel state information reference signal (CSI-RS) output by a first cell operating in an energy saving mode 820    Receive timing information output by a second cell 830    Measure the CSI-RS output by the first cell using the timing information output by the second cell

800

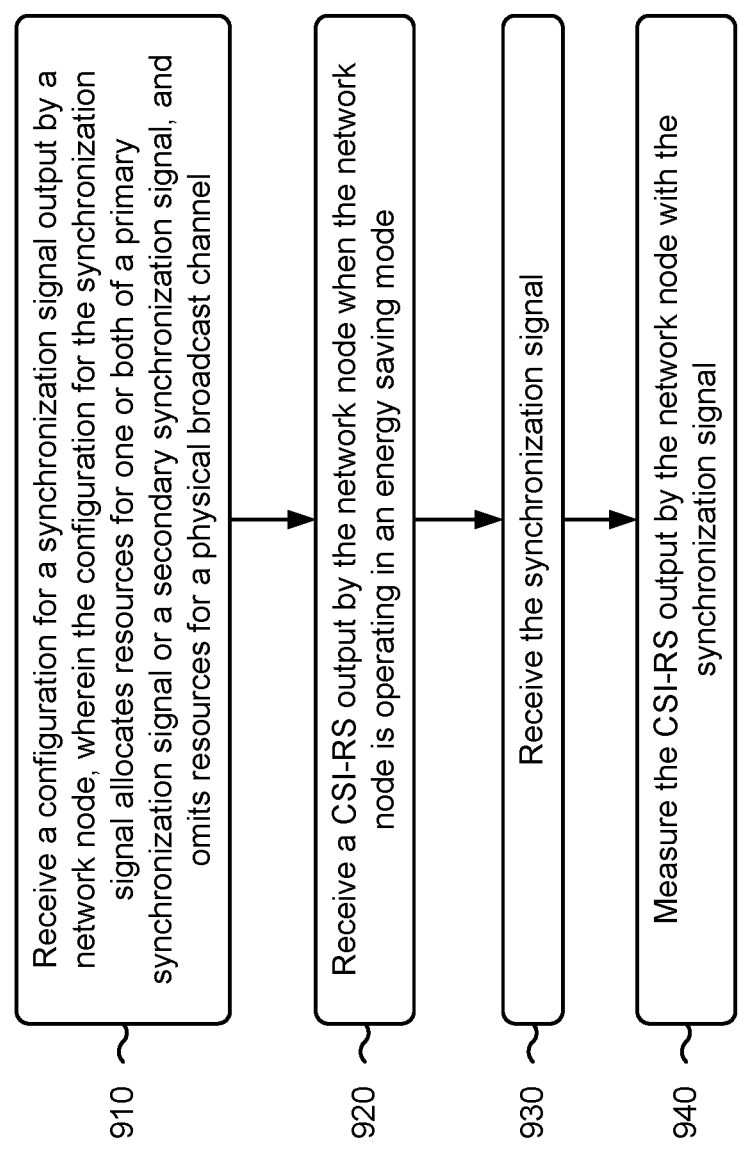

910 — Receive a configuration for a synchronization signal output by a network node, wherein the configuration for the synchronization signal allocates resources for one or both of a primary synchronization signal or a secondary synchronization signal, and omits resources for a physical broadcast channel 920 — Receive a CSI-RS output by the network node when the network node is operating in an energy saving mode 930 — Receive the synchronization signal 940 — Measure the CSI-RS output by the network node with the synchronization signal

1010 Output or configure a CSI-RS

1020 Output or configure timing information based, at least in part, on an operating mode of a first cell of the network node

1000

CELL MEASUREMENTS IN ENERGY SAVING MODE

FIELD OF THE DISCLOSURE

Aspects of the present disclosure generally relate to wireless communication and to techniques and apparatuses for performing cell measurements when a network node is operating in an energy saving mode.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

Some aspects described herein relate to a method of wireless communication performed by a user equipment (UE). The method may include receiving a channel state information (CSI) reference signal (RS) (CSI-RS) output by a first cell operating in an energy saving mode. The method may include receiving timing information output by a second cell. The method may include measuring the CSI-RS output by the first cell using the timing information output by the second cell.

Some aspects described herein relate to a method of wireless communication performed by a UE. The method may include receiving a configuration for a synchronization signal output by a network node, the configuration for the synchronization signal allocating resources for one or both of a primary synchronization signal or a secondary synchronization signal, and omits resources for a physical broadcast channel. The method may include receiving a CSI-RS output by the network node when the network node is operating in an energy saving mode. The method may include receiving the synchronization signal. The method may include measuring, with the synchronization signal, the CSI-RS output by the network node.

Some aspects described herein relate to a method of wireless communication performed by a network node. The method may include outputting or configuring a CSI-RS. The method may include outputting or configuring timing information based, at least in part, on an operating mode of a first cell of the network node.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of physical channels and reference signals in a wireless network, in accordance with the present disclosure.

FIG. 9 shows a method for wireless communications by a network entity, such as a BS, or a disaggregated base station as discussed with respect to FIG. 3.

DETAILED DESCRIPTION

Figure 1:
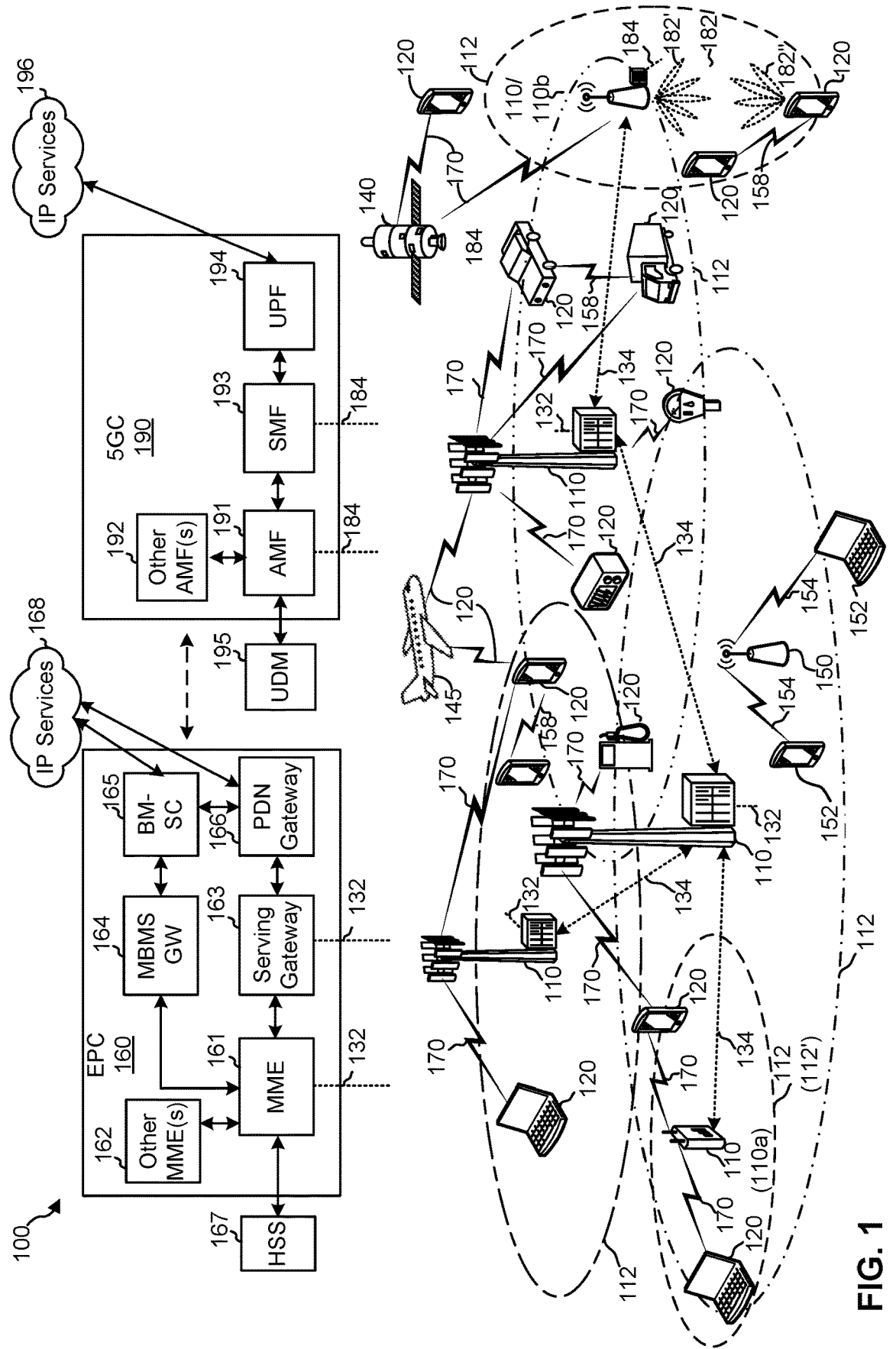
FIG. 1 depicts an example of a wireless communications network, in accordance with the present disclosure.

Aspects of the present disclosure provide apparatuses, methods, processing systems, and computer-readable mediums for performing cell measurements when a network node is operating in an energy saving mode.

A cell operating in an energy saving (ES) mode (also called an ES cell) may not periodically transmit a synchronization signal block (SSB), which may carry timing information used for initial network acquisition and synchronization. Without the SSB from the ES cell, a user equipment (UE) may not be able to perform certain operations, such as channel state information reference signal (CSI-RS) measurements, on communications from the ES cell.

In situations where there is no periodic SSB from the ES cell, the UE may seek to estimate or otherwise determine the timing information of the ES cell from other sources, such as a reference cell. For example, if an associated SSB is indicated in a radio resource control (RRC) measurement object, the UE may attempt to detect and/or measure SSBs sent by a neighboring cell. That option may not be available, however, for ES cells that do not transmit the SSB. If a reference serving cell index is indicated in the RRC measurement object, the UE may be able to use the timing information from the indicated serving cell as the reference to measure the CSI-RS on the ES cell. If the associated SSB and reference serving cell index are not available, the UE may be able to use the timing information from a primary cell (PCell) as the reference. One issue, however, is that the ES cell may not be tightly synchronized with the reference serving cell, which means using timing information from the reference serving cell may not result in accurate processing of signals from the ES cell.

Various options are described herein for addressing situations where the ES cell does not periodically transmit the SSB. One option may include enhancing the RRC configuration of radio resource management (RRM) measurements by, for example, applying a timing offset to the timing of the reference cell. Another option may include configuring the ES cell to transmit a light SSB (e.g., transmitting only the primary synchronization signal (PSS) or only the PSS and secondary synchronization signal (SSS)). Another option may include having the ES cell adjust its transmission or reception timing reference based on an ES mode of operation. For example, the ES cell may synchronize with a neighboring reference cell and/or make other adjustments, described below, to better align with the reference cell.

Accordingly, some techniques described herein provide for the UE to perform various operations in situations where the ES cell does not periodically transmit the SSB. As a result, the ES cell can operate in an ES state to reduce overall energy consumption with minimal impact to the UE and possibly other network components.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
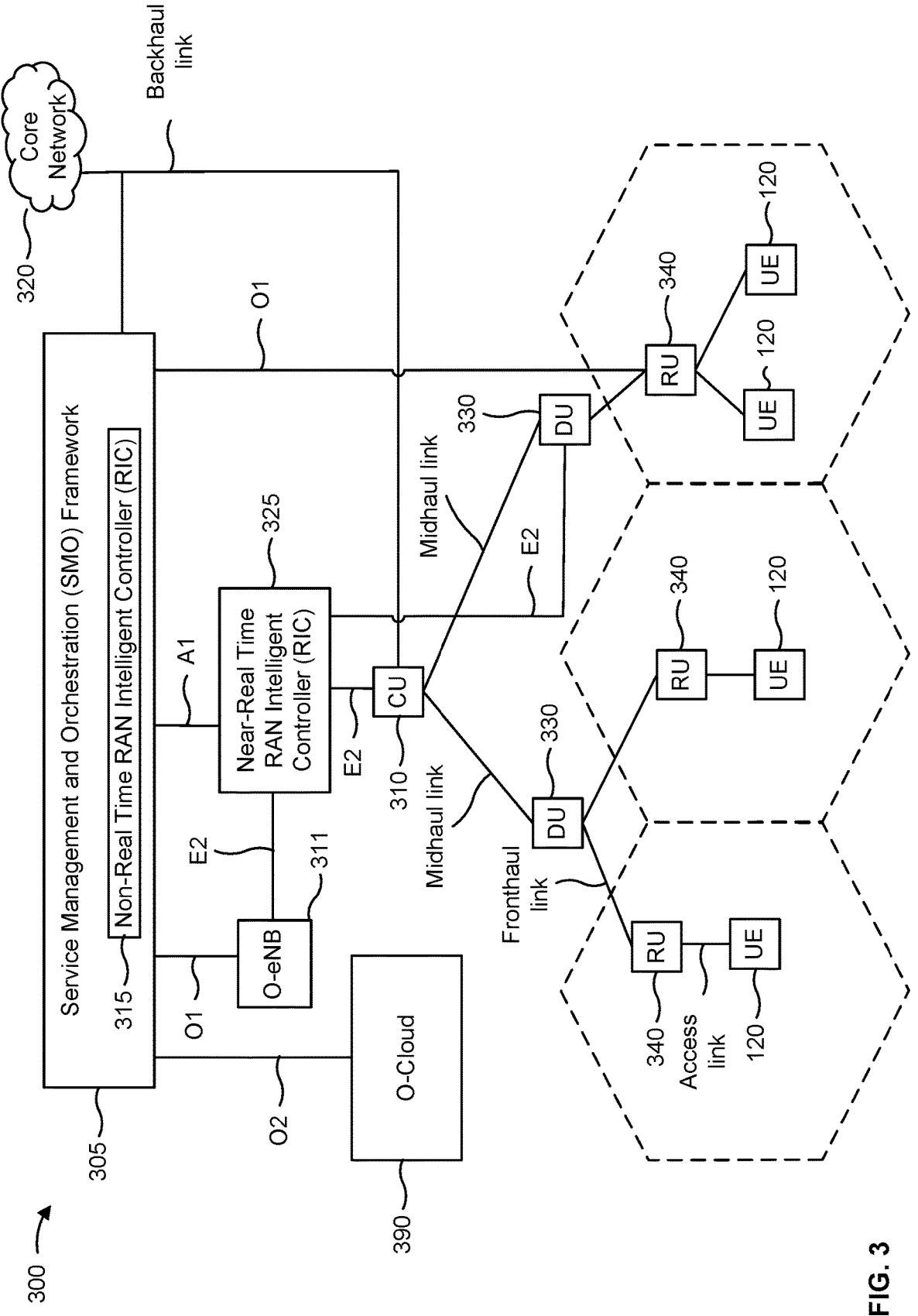
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mm Wave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHZ, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/ or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QOS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
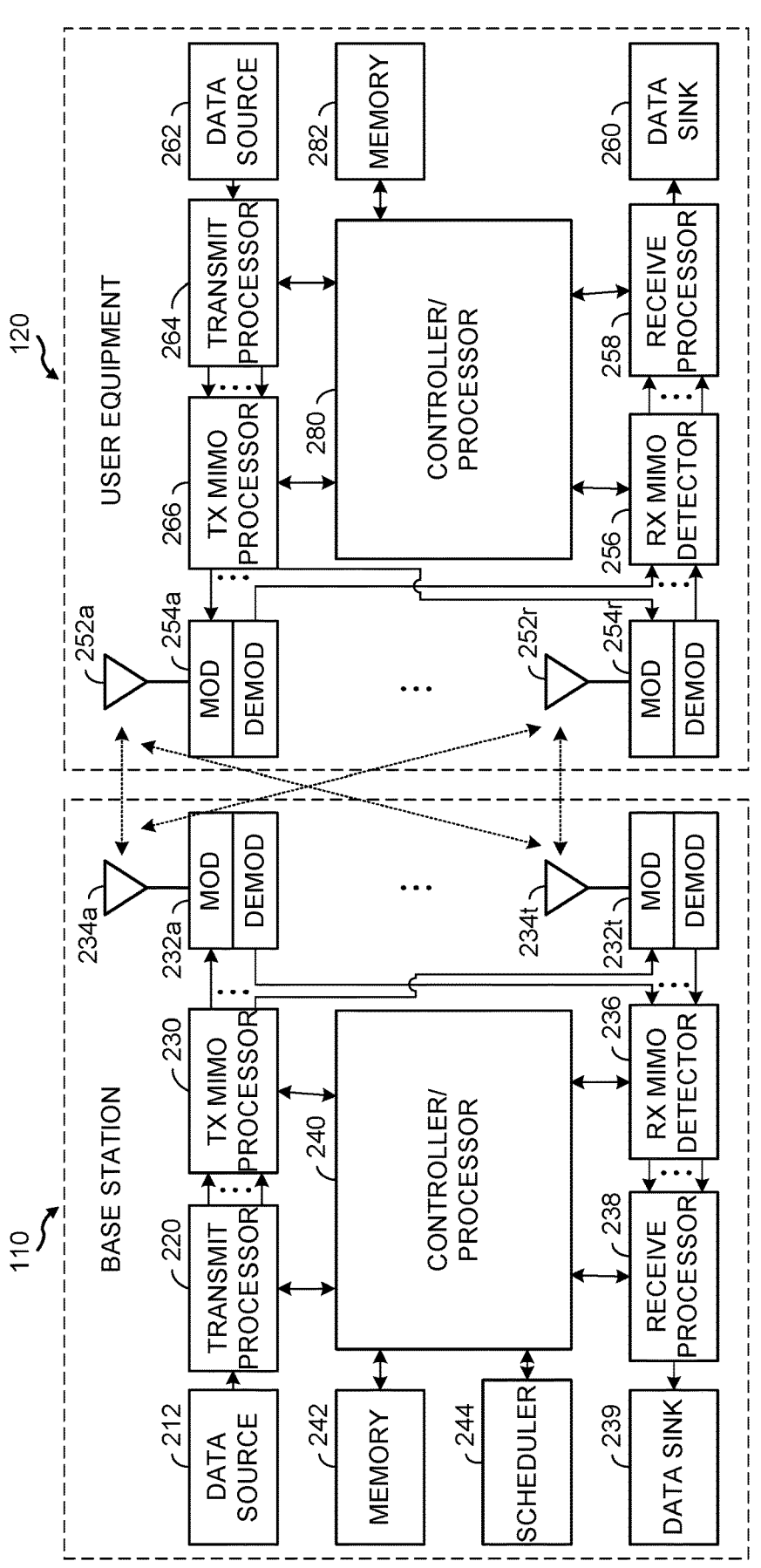
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252a-r (collectively 252), transceivers 254a-r (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example DL transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the PSS, the SSS, the PBCH demodulation reference signal (DMRS), or the CSI-RS.

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a DL signal. DL signals from the modulators in transceivers 232a-232t may be transmitted via the antennas 234a-234t, respectively.

UE 120 includes antennas 252a-252r that may receive the DL signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example UL transmission, UE 120 further includes a transmit processor 264 that may receive and process data (e.g., for the physical uplink shared channel (PUSCH) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the UL signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the DL and/or UL.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include RRC, packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
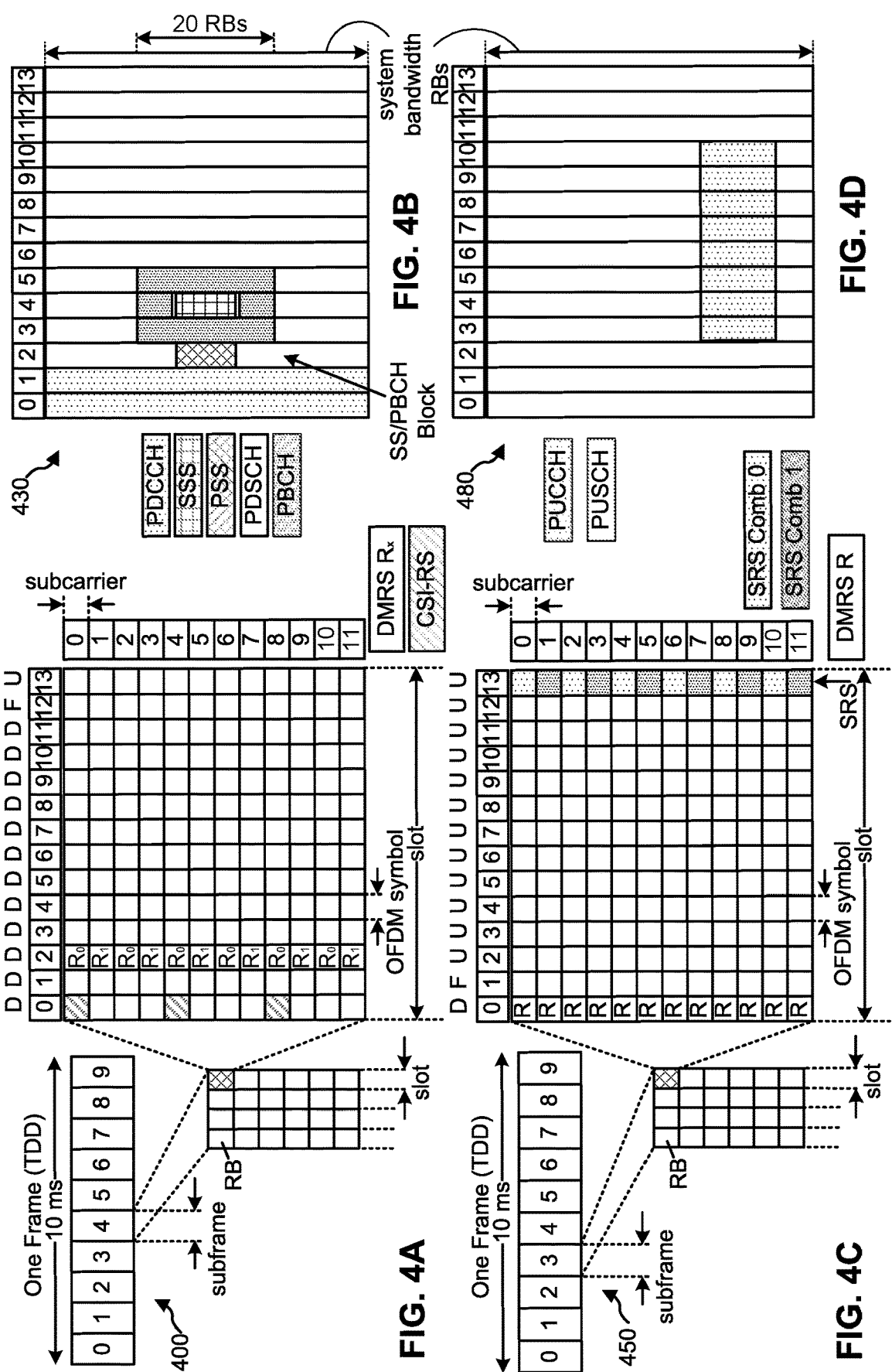
FIGS. 4A, 4B, 4C, and 4D depict aspects of data structures for a wireless communications network, such as the wireless communications network of FIG. 1, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the UL and DL. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu} \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries UL control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

FIG. 5 is a diagram illustrating an example 500 of physical channels and reference signals in a wireless network, in accordance with the present disclosure. As shown in FIG. 5, DL channels and DL reference signals may carry information from a network node 110 to a UE 120, and UL channels and UL reference signals may carry information from a UE 120 to a network node 110.

As shown, a DL channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, a UL channel may include a physical uplink control channel (PUCCH) that carries UL control information (UCI), a physical uplink shared channel (PUSCH) that carries UL data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a DL reference signal may include an SSB, a CSI-RS, a DMRS, a positioning reference signal (PRS), or a phase tracking reference signal (PTRS), among other examples. As also shown, a UL reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for DL channel estimation (e.g., DL CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 110 may use the CSI report to select transmission parameters for DL communications to the UE 120, such as a number of transmission layers (e.g., a rank), a precoding matrix (e.g., a precoder), a modulation and coding scheme (MCS), or a refined DL beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both DL communications and UL communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both DL communications (e.g., on the PDSCH) and UL communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect DL signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for UL channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as UL CSI acquisition, DL CSI acquisition for reciprocity-based operations, UL beam management, among other examples. The network node 110 may measure the SRSs, may perform channel estimation based at least in part on the measurements, and may use the SRS measurements to configure communications with the UE 120.

As indicated above, FIG. 5 is provided as an example. Other examples may differ from what is described with regard to FIG. 5.

An ES cell operating in an ES mode may not periodically transmit an SSB, which may carry timing information used for initial network acquisition and synchronization. Without the SSB from the ES cell, a UE (such as UE 120) may not be able to perform certain operations, such as CSI-RS measurements, on communications from the ES cell.

In situations where there is no periodic SSB from the ES cell, the UE may seek to estimate or otherwise determine the timing information of the ES cell from other sources, such as a reference cell (also called an "anchor cell"). For example, if an associated SSB is indicated in a RRC measurement object, the UE may attempt to detect and/or measure SSBs sent by a neighboring cell. That option may not be available, however, for ES cells that do not transmit the SSB. If a reference serving cell index is indicated in the RRC measurement object, the UE may be able to use the timing information from the indicated serving cell as the reference to measure the CSI-RS on the ES cell. If the associated SSB and reference serving cell index are not available, the UE may be able to use the timing information from a PCell as the reference. One issue, however, is that the ES cell may not be tightly synchronized with the reference serving cell, which means using timing information from the reference serving cell may not result in accurate processing of signals from the ES cell.

Various options are described herein for addressing situations where the ES cell does not periodically transmit the SSB. One option may include enhancing the RRC configuration of RRM measurements by, for example, applying a timing offset to the timing of the reference cell. Another option may include configuring the ES cell to transmit a light SSB (e.g., transmitting only the PSS or only the PSS and the SSS). Another option may include having the ES cell adjust its transmission or reception timing reference based on an ES mode of operation. For example, the ES cell May synchronize with a neighboring reference cell and/or make other adjustments, described below, to better align with the reference cell.

Some techniques and apparatuses described herein provide for a UE to receive the CSI-RS output by a first cell operating in an energy saving mode; receive timing information output by a second cell; and measure the CSI-RS output by the first cell using the timing information output by the second cell. Accordingly, the UE can perform measurements on the CSI-RS output by an ES cell (i.e., a cell operating in an ES mode) even though, for example, the ES cell does not periodically transmit the SSB, which allows the ES cell to operate in the ES state and reduce overall network energy consumption.

Some techniques and apparatuses described herein provide for a UE to receive a CSI-RS output by a network node operating in an energy saving mode; receive a configuration for a synchronization signal output by the network node, the configuration for the synchronization signal allocating resources for one or both of a primary synchronization signal or a secondary synchronization signal, and omitting resources for a physical broadcast channel; receive the synchronization signal; and measure the CSI-RS output by the network node with the synchronization signal. Accordingly, the UE can perform measurements on the CSI-RS output by an ES cell (i.e., a cell operating in an ES mode) even though, for example, the ES cell only transmits portions of the SSB, which allows the ES cell to operate in the ES state and reduce overall network energy consumption.

Figure 6:
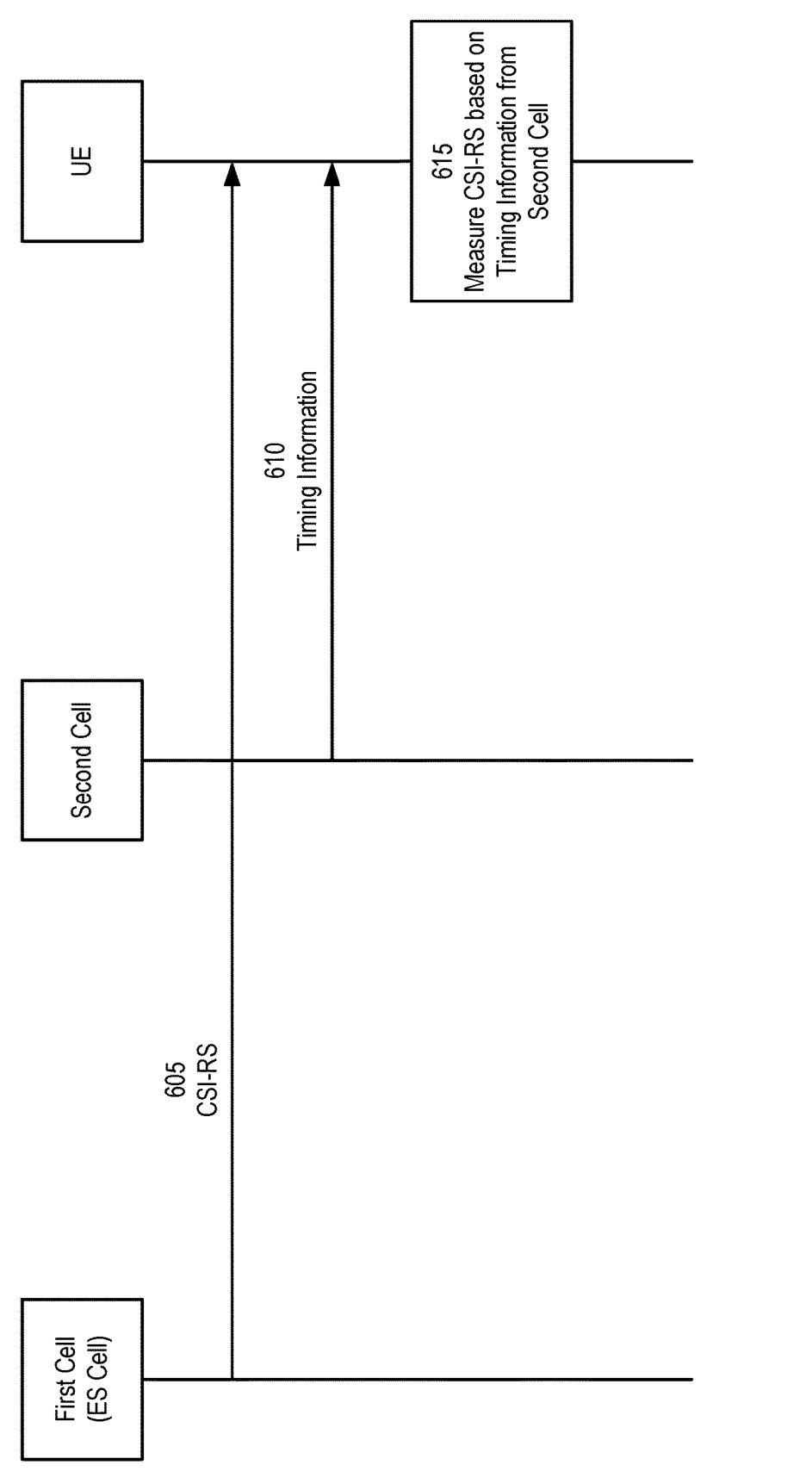
FIG. 6 is a diagram illustrating an example associated with performing cell measurements on an energy saving (ES) cell, in accordance with the present disclosure.

FIG. 6 is a diagram illustrating an example 600 associated with performing cell measurements on an ES cell, in accordance with the present disclosure. As shown in FIG. 6, a first cell, a second cell, and a UE (such as UE 120) may communicate with one another. The first cell and the second cell may be part of the same BS 110 or different BSs 110s relative to one another. In some aspects, the second cell is a serving cell neighboring the first cell. In some aspects, the first cell is a secondary cell (SCell) and the second cell is a PCell. The first cell may be configured to operate in the ES mode and the second cell may be configured to operate as a reference cell, relative to the first cell, for purposes of providing timing information while the first cell is operating in the ES mode.

As shown by reference number 605, the first cell may transmit, and the UE may receive, the CSI-RS. The CSI-RS may be transmitted by the first cell while the first cell is operating in the ES mode.

As shown by reference number 610, the second cell may transmit, and the UE may receive, timing information. The timing information may be transmitted by the second cell as an RRC configuration of RRM measurements. The timing information from the second cell may include a synchronization signal such as an SSB. In some aspects, such as when the reference serving cell index is provided to the UE for timing information, the second cell may transmit a timing offset for the UE to apply when measuring the CSI-RS from the first cell based on the timing information from the second cell. In some aspects, the timing offset may indicate a difference in timing between the timing information of the first cell and the timing information of the second cell. In some aspects, the timing offset is a single value. In some aspects, the timing offset is a window or range of values.

In some aspects, the timing information transmitted by the second cell may be modified based on, for example, whether or not the second cell is operating as the reference cell to the first cell. In some aspects, the first cell and the second cell may perform a synchronization operation to synchronize with one another. Accordingly, the timing information output by the second cell may be synchronized with the timing of the first cell while the first cell is operating in the ES mode. Alternatively or in addition, when operating in the ES mode, the first cell may adjust its timing to more closely match the timing of the second cell. Alternatively or in addition, the second cell, when operating in a compensation mode (i.e., compensating for the first cell operating in the ES mode), may adjust the timing information transmitted to the UE to be more synchronized with the timing of the first cell. Any timing adjustments made by the first cell, the second cell, or both, may be applied to DL transmission timing, UL reception timing, and/or a combination thereof, among other examples. In some aspects, adjustments to DL transmission and/or UL reception timings of the first cell and/or the second cell may account for propagation delay relative to the UE.

In some aspects, the first cell and the second cell may be configured for backhaul coordination when adjusting the timing between the first cell and the second cell. Backhaul coordination may occur via signaling between different interfaces such as between the CU and DU of a BS 110, between two CUs of the BS 110, between a DU and RU of the BS 110, and/or a combination thereof, among other examples. In some aspects, backhaul coordination may occur via an air interface (Uu) command to change timing associated with a repeater. In some aspects, such as in integrated access and backhaul (IAB) implementations, backhaul coordination may occur over the Uu interface between a parent DU and an IAB mobile termination (MT) antenna.

In some aspects, timing coordination may occur via various signaling including a request for timing alignment, an indication of an adjusted timing, an amount of timing adjustment, information about propagation delay and/or cell coverage, information about a DL transmission and UL reception timing gap at a cell, a maximum or range of adjustment that one cell can support, and/or a combination thereof, among other examples. In one example, the information about the timing of the second cell (e.g., the reference cell) or the required timing adjustment may be indicated or acquired by the second cell. For example, as part of a coordination between the first cell and the second cell, the required timing adjustment may be indicated by an adjustment value and/or an indication of whether to apply the timing of the first cell or the second cell.

As shown by reference number 615, the UE may measure the CSI-RS output by the first cell using the timing information output by the second cell. In some aspects, the UE may apply the synchronization indicated in the SSB received from the second cell when measuring the CSI-RS output by the first cell. In some aspects, the UE may apply the timing offset to the synchronization indicated in the SSB received from the second cell when measuring the CSI-RS output by the first cell. Accordingly, in some aspects, applying the timing offset may include adjusting the timing information by the timing offset and measuring the CSI-RS output by the first cell based, at least in part, on the adjusted timing information.

As indicated above, FIG. 6 is provided as an example. Other examples may differ from what is described with respect to FIG. 6.

Figure 7:
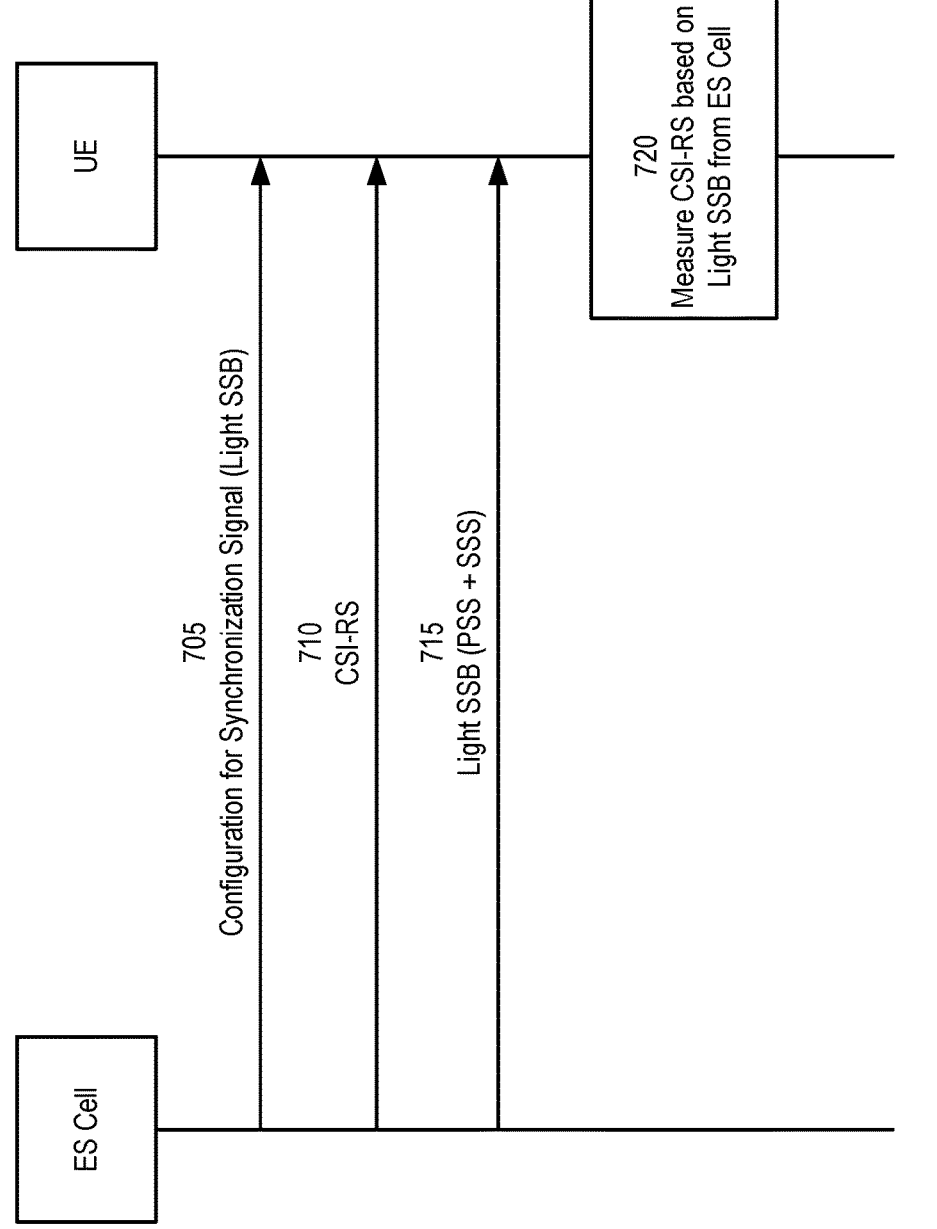
FIG. 7 is a diagram illustrating an example associated with performing cell measurements on an ES cell, in accordance with the present disclosure.

FIG. 7 is a diagram illustrating an example 700 associated with performing cell measurements on an ES cell, in accordance with the present disclosure. As shown in FIG. 7, an ES cell (which may be part of BS 110) and a UE (such as UE 120) may communicate with one another.

As shown by reference number 705, the ES cell may transmit, and the UE may receive, a configuration for a synchronization signal. In some aspects, the synchronization signal is a modified or "light" SSB signal (e.g., an SSB signal that includes only the PSS or only the PSS and SSS). The configuration for the synchronization signal may allocate resources for the PSS or the PSS and SSS. The configuration for the synchronization signal may omit allocating resources for the PBCH. In some aspects, the configuration for the synchronization signal may be received via RRC signaling. In some aspects, the configuration configures the UE to use the timing acquired from the synchronization signal for CSI-RS processing. In some aspects, RRC signaling may also provide resources and configurations for the synchronization signal and CSI-RS of the ES cell.

As shown by reference number 710, the ES cell may transmit, and the UE may receive, the CSI-RS.

As shown by reference number 715, the ES cell may transmit, and the UE may receive, the synchronization signal. In accordance with the configuration discussed above, the synchronization signal may include the PSS, or the PSS and the SSS. In some aspects, the synchronization signal may omit the PBCH.

As shown by reference number 720, the UE may measure the CSI-RS output by the ES cell using the timing information indicated by the synchronization signal.

As indicated above, FIG. 7 is provided as an example. Other examples may differ from what is described with respect to FIG. 7.

Figure 8:
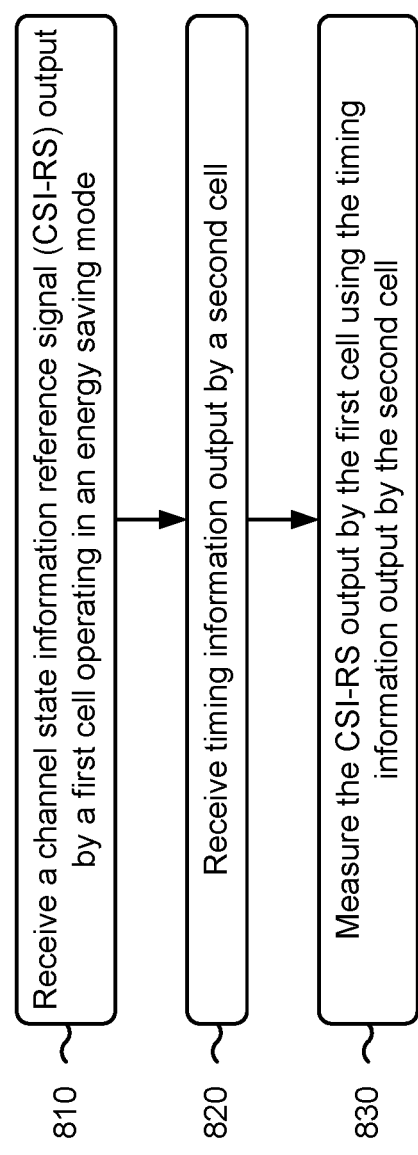
FIG. 8 shows a method for wireless communications by a UE, in accordance with the present disclosure.

FIG. 8 shows a method 800 for wireless communications by a UE, such as UE 120.

Method 800 begins at 810 with receiving a CSI-RS output by a first cell operating in an ES mode.

Method 800 then proceeds to step 820 with receiving timing information output by a second cell.

Method 800 then proceeds to step 830 with measuring the CSI-RS output by the first cell using the timing information output by the second cell.

In one aspect, method 800 further includes receiving a timing offset to be applied to the timing information output by the second cell.

In one aspect, measuring the CSI-RS output by the first cell using the timing information includes adjusting the timing information by the timing offset, and measuring the CSI-RS output by the first cell based, at least in part, on the adjusted timing information.

In one aspect, the timing offset is a single value.

In one aspect, the timing offset is a range of values.

In one aspect, method 800 further includes receiving a configuration identifying the second cell.

In one aspect, the configuration is received via RRC signaling.

In one aspect, the second cell is a serving cell neighboring the first cell.

In one aspect, the second cell is a primary cell.

In one aspect, method 800 further includes coordinating backhaul signaling with the first cell.

Figure 11:
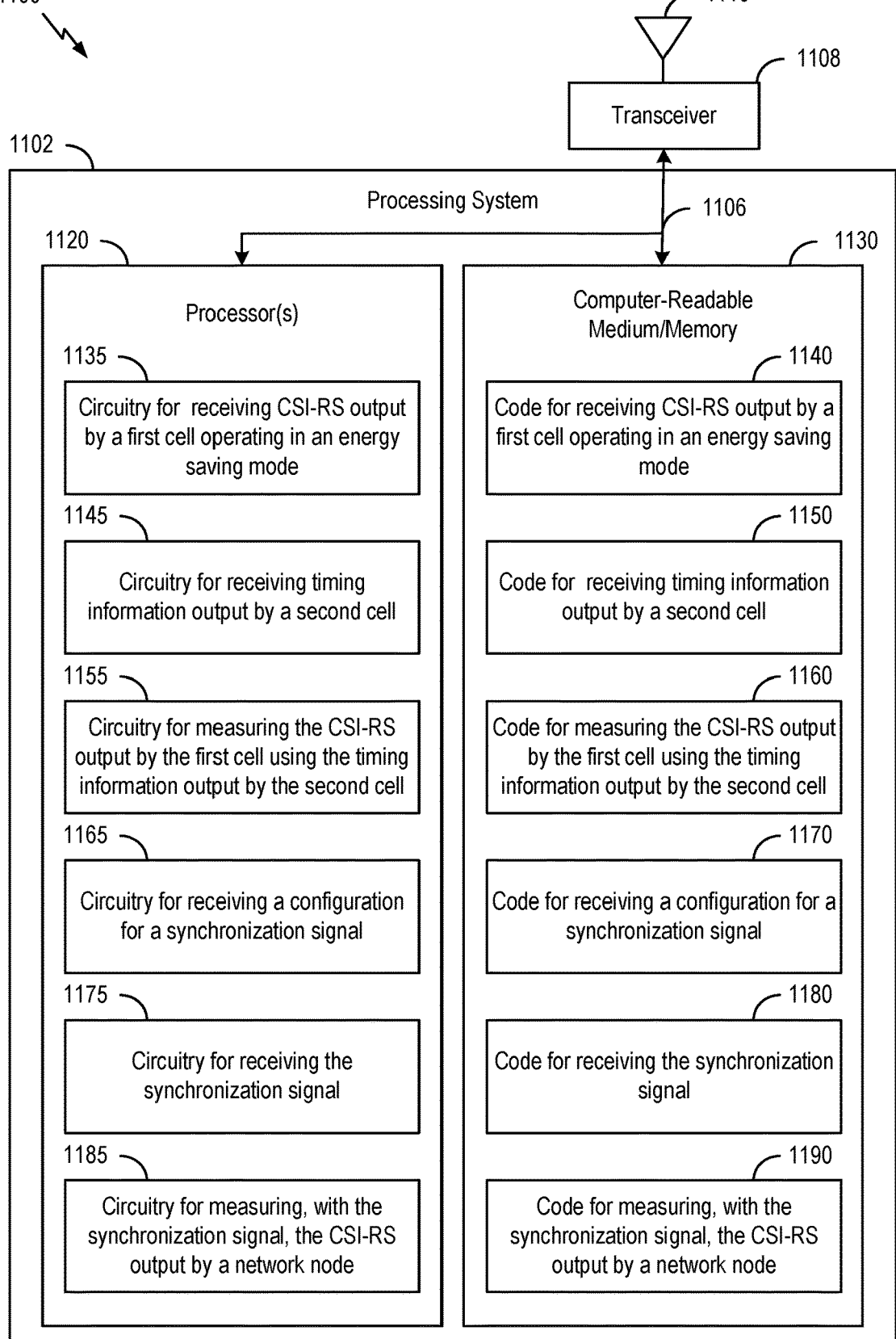
FIG. 11 is a diagram illustrating an example of an implementation of code and circuitry for a communications device, in accordance with the present disclosure.

In one aspect, method 800, or any aspect related to it, may be performed by an apparatus, such as communications device 1100 of FIG. 11, which includes various components operable, configured, or adapted to perform the method 800. Communications device 1100 is described below in further detail.

Note that FIG. 8 is just one example of a method, and other methods including fewer, additional, or alternative steps are possible consistent with this disclosure.

FIG. 9 shows a method 900 for wireless communications by a network entity, such as BS 110, or a disaggregated base station as discussed with respect to FIG. 3.

Method 900 begins at 910 with receiving a configuration for a synchronization signal output by a network node, wherein the configuration for the synchronization signal allocates resources for one or both of a primary synchronization signal or a secondary synchronization signal, and omits resources for a physical broadcast channel.

Method 900 then proceeds to step 920 with receiving a CSI-RS output by the network node when the network node is operating in an energy saving mode.

Method 900 then proceeds to step 930 with receiving the synchronization signal.

Method 900 then proceeds to step 940 with measuring the CSI-RS output by the network node with the synchronization signal.

In one aspect, the configuration is received via RRC signaling.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
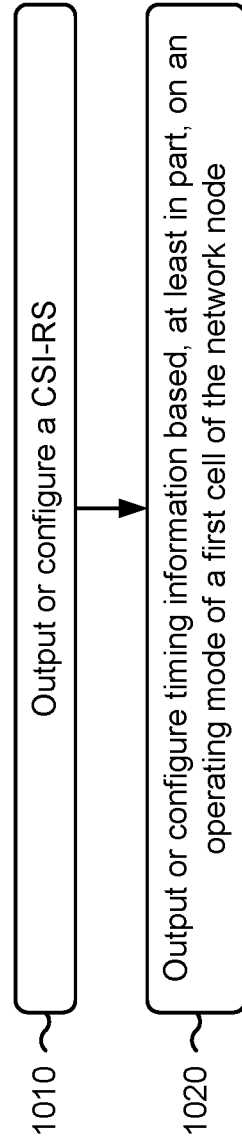
FIG. 10 shows a method for wireless communications by a network entity, such as a BS, or a disaggregated base station as discussed with respect to FIG. 3.

FIG. 10 shows a method 1000 for wireless communications by a network entity, such as BS 110, or a disaggregated base station as discussed with respect to FIG. 3.

Method 1000 begins at 1010 with outputting or configuring a CSI-RS.

Method 1000 then proceeds to step 1020 with outputting or configuring timing information based, at least in part, on an operating mode of a first cell of the network node.

In one aspect, method 1000 further includes adjusting a timing reference of the first cell relative to a timing reference of a second cell as a result of the operating mode of the first cell being an energy saving mode.

In one aspect, the second cell is an anchor cell relative to the first cell.

In one aspect, method 1000 further includes adjusting a timing reference of the first cell relative to the timing reference of a second cell as a result of the operating mode of the first cell being a compensation mode and the operating mode of the second cell being an energy saving mode.

In one aspect, the timing information includes one or more of DL timing information or UL timing information.

In one aspect, the DL timing information is different from the UL timing information.

In one aspect, method 1000 further includes transmitting or receiving backhaul coordination signaling between the first cell and the second cell.

In one aspect, the backhaul coordination signaling includes a reqUEst for a timing alignment.

In one aspect, the backhaul coordination signaling includes adjusted timing information.

In one aspect, the backhaul coordination signaling includes a timing adjustment value.

In one aspect, the backhaul coordination signaling includes one or more of propagation delay information, cell coverage information, or DL transmission and UL reception timing gap information.

In one aspect, the backhaul coordination signaling includes an indication of a maximum timing adjustment for communication with the first cell.

In one aspect, the backhaul coordination signaling includes an indication of a range of timing adjustments for communication with the first cell.

In one aspect, the backhaul coordination signaling includes an indication that the second cell is an anchor cell of the first cell.

In one aspect, the backhaul coordination signaling is transmitted between one or more of a DU, an RU, or a CU of the first cell and one or more of a DU, an RU, or a CU of the second cell. In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

FIG. 11 is a diagram illustrating an example of an implementation of code and circuitry for a communications device 1100, in accordance with the present disclosure. The communications device 1100 may be a UE, or a UE may include the communications device 1100.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 258, transmit processor 264, TX MIMO processor 266, and/or controller/processor 280, as described with respect to FIG. 2. The one or more processors 1120 are coupled to a computer-readable medium/memory 1130 via a bus 1106. In various aspects, the computer-readable medium/memory 1130 may be representative of memory 282, as described with respect to FIG. 2. In certain aspects, the computer-readable medium/memory 1130 is configured to store instructions (e.g., computer-executable code, processor-executable code) that when executed by the one or more processors 1120, cause the one or more processors 1120 to perform the method 800 described with respect to FIG. 8, or any aspect related to it. Note that reference to a processor performing a function of communications device 1100 may include one or more processors performing that function of communications device 1100.

As shown in FIG. 11, the communications device 1100 may include circuitry for receiving a CSI-RS output by a first cell operating in an energy saving mode (circuitry 1135).

As shown in FIG. 11, the communications device 1100 may include, stored in computer-readable medium/memory 1130, code for receiving a CSI-RS output by a first cell operating in an energy saving mode (code 1140).

As shown in FIG. 11, the communications device 1100 may include circuitry for receiving timing information output by a second cell (circuitry 1145).

As shown in FIG. 11, the communications device 1100 may include, stored in computer-readable medium/memory 1130, code for receiving timing information output by a second cell (code 1150).

As shown in FIG. 11, the communications device 1100 may include circuitry for measuring the CSI-RS output by the first cell using the timing information output by the second cell (circuitry 1155).

As shown in FIG. 11, the communications device 1100 may include, stored in computer-readable medium/memory 1130, code for measuring the CSI-RS output by the first cell using the timing information output by the second cell (code 1160).

As shown in FIG. 11, the communications device 1100 may include circuitry for receiving a configuration for a synchronization signal output by a network node, wherein the configuration for the synchronization signal allocates resources for one or both of a primary synchronization signal or a secondary synchronization signal, and omits resources for a physical broadcast channel (circuitry 1165).

As shown in FIG. 11, the communications device 1100 may include, stored in computer-readable medium/memory 1130, code for receiving a configuration for a synchronization signal output by a network node, wherein the configuration for the synchronization signal allocates resources for one or both of a primary synchronization signal or a secondary synchronization signal, and omits resources for a physical broadcast channel (code 1170).

As shown in FIG. 11, the communications device 1100 may include circuitry for receiving the synchronization signal (circuitry 1175).

As shown in FIG. 11, the communications device 1100 may include, stored in computer-readable medium/memory 1130, code for receiving the synchronization signal (code 1180).

As shown in FIG. 11, the communications device 1100 may include circuitry for measuring, with the synchronization signal, the CSI-RS output by the network node (circuitry 1185).

As shown in FIG. 11, the communications device 1100 may include, stored in computer-readable medium/memory 1130, code for measuring, with the synchronization signal, the CSI-RS output by the network (code 1190).

Various components of the communications device 1100 may provide means for performing the method 800 described with respect to FIG. 8, the method 900 described with respect to FIG. 9, or any aspects related to them. For example, means for transmitting, sending, or outputting for transmission may include the transceiver(s) 254 and/or antenna(s) 252 of the UE 120 and/or transceiver 1108 and antenna 1110 of the communications device 1100 in FIG. 11. Means for receiving or obtaining may include the transceiver(s) 254 and/or antenna(s) 252 of the UE 120 and/or transceiver 1108 and antenna 1110 of the communications device 1100 in FIG. 11.

FIG. 11 is provided as an example. Other examples may differ from what is described in connection with FIG. 11.

Figure 12:
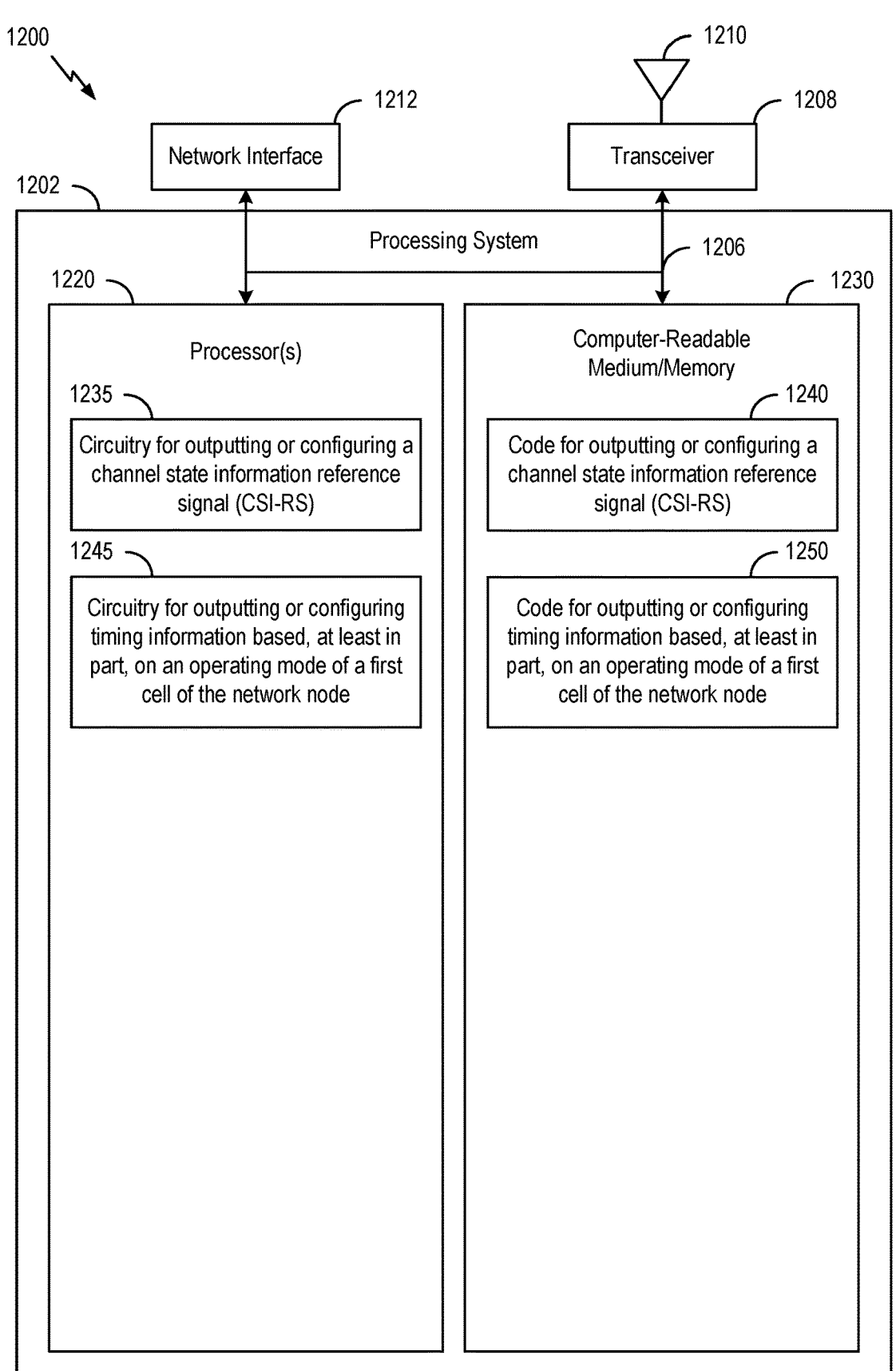
FIG. 12 is a diagram illustrating an example of an implementation of code and circuitry for a communications device, in accordance with the present disclosure.

FIG. 12 is a diagram illustrating an example of an implementation of code and circuitry for a communications device 1200, in accordance with the present disclosure. The communications device 1200 may be a network node (such as BS 110 or a disaggregated base station as described with regard to FIG. 3), or a network node may include the communications device 1200.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 3. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 238, transmit processor 220, TX MIMO processor 230, and/or controller/processor 240, as described with respect to FIG. 2. The one or more processors 1220 are coupled to a computer-readable medium/memory 1230 via a bus 1206. In various aspects, the computer-readable medium/memory 1230 may be representative of memory 242, as described with respect to FIG. 2. In certain aspects, the computer-readable medium/memory 1230 is configured to store instructions (e.g., computer-executable code, processor-executable code) that when executed by the one or more processors 1220, cause the one or more processors 1220 to perform the method 1000 described with respect to FIG. 10, or any aspect related to it. Note that reference to a processor performing a function of communications device 1200 may include one or more processors performing that function of communications device 1200.

As shown in FIG. 12, the communications device 1200 may include circuitry for outputting or configuring a CSI-RS (circuitry 1235).

As shown in FIG. 12, the communications device 1200 may include, stored in computer-readable medium/memory 1230, code for outputting or configuring a CSI-RS (code 1240).

As shown in FIG. 12, the communications device 1200 may include circuitry for outputting or configuring timing information based, at least in part, on an operating mode of a first cell of the network node (circuitry 1245).

As shown in FIG. 12, the communications device 1200 may include, stored in computer-readable medium/memory 1230, code for outputting or configuring timing information based, at least in part, on an operating mode of a first cell of the network node (code 1250).

Various components of the communications device 1200 may provide means for performing the method 1000 described with respect to FIG. 10, or any aspect related to it. For example, means for transmitting, sending, or outputting for transmission may include the transceiver(s) 232 and/or antenna(s) 234 of the BS 110 and/or transceiver 1208 and antenna 1210 of the communications device 1200 in FIG. 12. Means for receiving or obtaining may include the transceiver(s) 232 and/or antenna(s) 234 of the BS 110 and/or transceiver 1208 and antenna 1210 of the communications device 1200 in FIG. 12.

FIG. 12 is provided as an example. Other examples may differ from what is described in connection with FIG. 12.

The following provides an overview of some Aspects of the present disclosure:

Aspect 1: A method of wireless communication performed by a UE, comprising: receiving a CSI-RS output by a first cell operating in an energy saving mode; receiving timing information output by a second cell; and measuring the CSI-RS output by the first cell using the timing information output by the second cell.

Aspect 2: The method of Aspect 1, further comprising receiving a timing offset to be applied to the timing information output by the second cell.

Aspect 3: The method of Aspect 2, wherein measuring the CSI-RS output by the first cell using the timing information includes: adjusting the timing information by the timing offset; and measuring the CSI-RS output by the first cell based, at least in part, on the adjusted timing information.

Aspect 4: The method of Aspect 2, wherein the timing offset is a single value.

Aspect 5: The method of Aspect 2, wherein the timing offset is a range of values.

Aspect 6: The method of any of Aspects 1-5, further comprising receiving a configuration identifying the second cell.

Aspect 7: The method of Aspect 6, wherein the configuration is received via RRC signaling.

Aspect 8: The method of any of Aspects 1-7, wherein the second cell is a serving cell neighboring the first cell.

Aspect 9: The method of any of Aspects 1-8, wherein the second cell is a primary cell.

Aspect 10: A method of wireless communication performed by a UE, comprising: receiving a configuration for a synchronization signal output by a network node, wherein the configuration for the synchronization signal allocates resources for one or both of a primary synchronization signal or a secondary synchronization signal, and omits resources for a physical broadcast channel; receiving a CSI-RS output by the network node when the network node is operating in an energy saving mode; receiving the synchronization signal; and measuring, with the synchronization signal, the CSI-RS output by the network node.

Aspect 11: The method of Aspect 10, wherein the configuration is received via RRC signaling.

Aspect 12: A method of wireless communication performed by a network node, comprising: outputting or configuring a CSI-RS; and outputting or configuring timing information based, at least in part, on an operating mode of a first cell of the network node.

Aspect 13: The method of Aspect 12, further comprising adjusting a timing reference of the first cell relative to a timing reference of a second cell as a result of the operating mode of the first cell being an energy saving mode.

Aspect 14: The method of Aspect 13, wherein the second cell is an anchor cell relative to the first cell.

Aspect 15: The method of Aspect 13, further comprising adjusting a timing reference of the first cell relative to the timing reference of a second cell as a result of the operating mode of the first cell being a compensation mode and the operating mode of the second cell being an energy saving mode.

Aspect 16: The method of Aspect 13, wherein the timing information includes one or more of DL timing information or UL timing information.

Aspect 17: The method of Aspect 13, wherein the DL timing information is different from the UL timing information.

Aspect 18: The method of Aspect 13, further comprising transmitting or receiving backhaul coordination signaling between the first cell and the second cell.

Aspect 19: The method of Aspect 18, wherein the backhaul coordination signaling includes a request for a timing alignment.

Aspect 20: The method of Aspect 18, wherein the backhaul coordination signaling includes adjusted timing information.

Aspect 21: The method of Aspect 18, wherein the backhaul coordination signaling includes a timing adjustment value.

Aspect 22: The method of Aspect 18, wherein the backhaul coordination signaling includes one or more of propagation delay information, cell coverage information, or DL transmission and UL reception timing gap information.

Aspect 23: The method of Aspect 18, wherein the backhaul coordination signaling includes an indication of a maximum timing adjustment for communication with the first cell.

Aspect 24: The method of Aspect 18, wherein the backhaul coordination signaling includes an indication of a range of timing adjustments for communication with the first cell.

Aspect 25: The method of Aspect 18, wherein the backhaul coordination signaling includes an indication that the second cell is an anchor cell of the first cell.

Aspect 26: The method of Aspect 18, wherein the backhaul coordination signaling is transmitted between one or more of a DU, an RU, or a CU of the first cell and one or more of a DU, an RU, or a CU of the second cell.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment for wireless communication, comprising:
   a memory; and
   one or more processors, coupled to the memory, configured to:
      receive a channel state information reference signal (CSI-RS) output by a first cell operating in an energy saving mode;
      receive timing information output by a second cell;
      receive a timing offset output by the second cell;
      adjust the timing information based at least in part on the timing offset; and
      measure the CSI-RS output by the first cell using the adjusted timing information.

2. The user equipment of claim 1,
   wherein the timing offset is a single value.

3. The user equipment of claim 1,
   wherein the timing offset is a range of values.

4. The user equipment of claim 1,
   wherein the one or more processors are further configured to receive a configuration identifying the second cell.

5. The user equipment of claim 4,
   wherein the configuration is received via radio resource control signaling.

6. The user equipment of claim 1,
   wherein the second cell is a serving cell neighboring the first cell.

7. The user equipment of claim 1,
   wherein the second cell is a primary cell.

8. A user equipment for wireless communication, comprising:
   a memory; and
   one or more processors, coupled to the memory, configured to:
      receive a configuration for a synchronization signal output by an energy saving (ES) cell, wherein the configuration for the synchronization signal allocates resources for one or both of a primary synchronization signal or a secondary synchronization signal, and omits resources for a physical broadcast channel;
      receive a channel state information reference signal (CSI-RS) output by the ES cell;
      receive the synchronization signal; and
      measure, with the synchronization signal, the CSI-RS output by the ES cell.

9. The user equipment of claim 8,
   wherein the configuration is received via radio resource control signaling.

10. A method of wireless communication performed by a user equipment, comprising:

receiving a channel state information reference signal (CSI-RS) output by a first cell operating in an energy saving mode;

receiving timing information output by a second cell;

receiving a timing offset output by the second cell;

adjusting the timing information based at least in part on the timing offset; and measuring the CSI-RS output by the first cell using the adjusted timing information.

11. The method of claim 10, wherein the timing offset is a single value.

12. The method of claim 10, wherein the timing offset is a range of values.

13. The method of claim 10, further comprising: receiving a configuration identifying the second cell.

14. The method of claim 13, wherein the configuration is received via radio resource control signaling.

15. The method of claim 10, wherein the second cell is a serving cell neighboring the first cell.

16. The method of claim 10, wherein the second cell is a primary cell.

\* \* \* \* \*